(12) United States Patent
Crowther et al.

(10) Patent No.: US 8,281,104 B2
(45) Date of Patent: Oct. 2, 2012

(54) METHOD AND APPARATUS FOR BALANCING STORAGE ACCESS ON INTELLIGENT DIGITAL DISK RECORDERS

(75) Inventors: David Aaron Crowther, Aloha, OR (US); James Edward Pearce, Bramley (GB); John Robert Naylor, Lake Oswego, OR (US)

(73) Assignee: GVBB Holdings S.A.R.L., Luxembourg (LU)

( * ) Notice: Subject to any disclaimer, the term of this patent is extended or adjusted under 35 U.S.C. 154(b) by 412 days.

(21) Appl. No.: 12/448,461

(22) PCT Filed: Jan. 19, 2007

(86) PCT No.: PCT/US2007/001542
§ 371 (c)(1),
(2), (4) Date: Jun. 19, 2009

(87) PCT Pub. No.: WO2008/088342
PCT Pub. Date: Jul. 24, 2008

(65) Prior Publication Data
US 2010/0023688 A1  Jan. 28, 2010

(51) Int. Cl.
*G06F 12/00* (2006.01)
(52) U.S. Cl. .......... 711/173; 711/114; 711/E12.001
(58) Field of Classification Search .......... 711/114, 711/117, 173, E12.001
See application file for complete search history.

(56) References Cited

U.S. PATENT DOCUMENTS

| | | | |
|---|---|---|---|
| 6,026,463 A | 2/2000 | Klein | |
| 6,028,725 A | 2/2000 | Blumenau | |
| 6,115,788 A * | 9/2000 | Thowe | 711/114 |
| 6,185,575 B1 | 2/2001 | Orcutt | |
| 6,202,118 B1 | 3/2001 | Klein | |
| 6,557,123 B1 | 4/2003 | Wiencko, Jr. et al. | |
| 6,578,068 B1 | 6/2003 | Bowman-Amuah | |
| 6,711,649 B1 | 3/2004 | Bachmat et al. | |
| 6,901,497 B2 | 5/2005 | Tashiro et al. | |
| 7,552,280 B1 * | 6/2009 | Naamad et al. | 711/114 |
| 2004/0186846 A1 | 9/2004 | Birdwell et al. | |
| 2005/0015546 A1 * | 1/2005 | Zohar et al. | 711/114 |

FOREIGN PATENT DOCUMENTS

| | | |
|---|---|---|
| JP | 3-34158 A | 2/1991 |
| JP | 2001-75742 A | 3/2001 |
| JP | 2004-030771 A | 1/2004 |
| JP | 2006-268534 A | 10/2006 |

OTHER PUBLICATIONS

"Mixing RAID types in different partitions", Tom's Hardware—Forum—Storage, May 10, 2006, Retrieved from the Internet: URL: http://www.tomshardware.co.uk/forum/203424-14-mixing-raid-types-partitions.

Triantafillou et al., "Optimal Data Placement on Disks: A Comprehensive Solution for Different Technologies", IEEE Transactions on Knowledge and Data Engineering, vol. 12, No. 2, Mar./Apr. 2000, pp. 1-7.

(Continued)

*Primary Examiner* — Yong Choe
(74) *Attorney, Agent, or Firm* — Arent Fox LLP

(57) ABSTRACT

A method includes designating at least three storage partitions on at least two logical drives, placing a first storage partition on a first of the logical drives adjacent to a second storage partition on a second of the logical drives separate from the first logical drives, and creating a third partition among both the first and second of the logical drives. The first, second and third partitions are balanced for storage access symmetry such that the drives bear equal storage placement.

23 Claims, 1 Drawing Sheet

OTHER PUBLICATIONS

The Extended European Search Report and the European Search Opinion, mailed Sep. 6, 2011 for the European Patent Application No. 07716850.8, European Patent Office.

International Search Report, dated Oct. 18, 2007.

Notice of Reasons for Rejection transmitted on Feb. 7, 2012 in Japanese Patent Application No. 2009-546354 (with English translation).

* cited by examiner

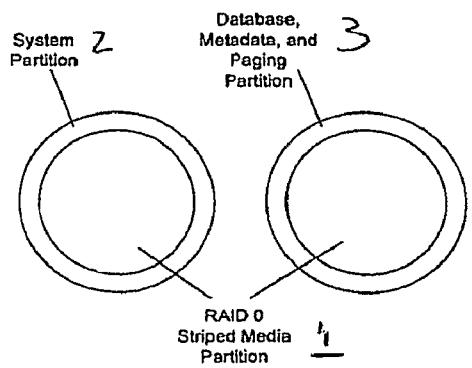
FIG. 1
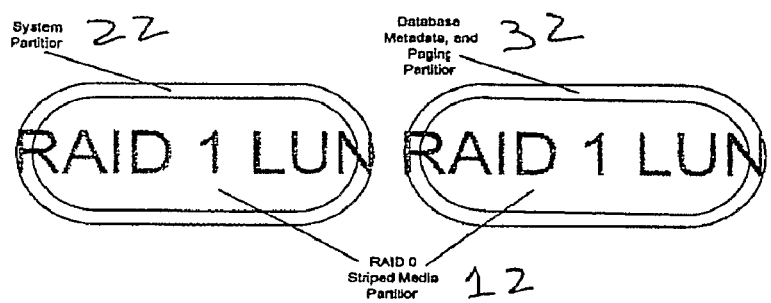
FIG. 2
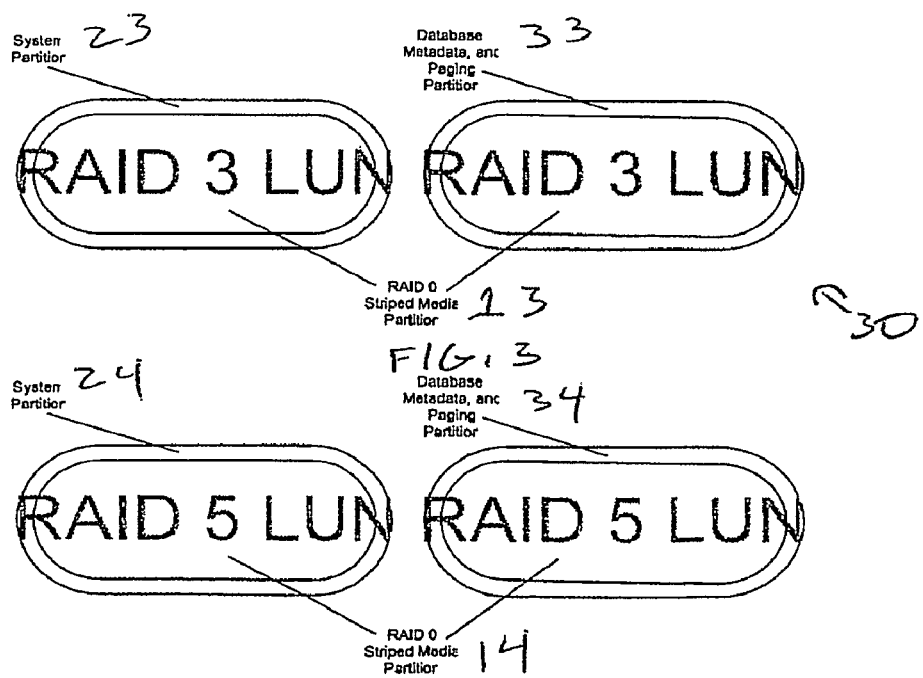
FIG. 3
FIG. 4

METHOD AND APPARATUS FOR BALANCING STORAGE ACCESS ON INTELLIGENT DIGITAL DISK RECORDERS

This application claims the benefit, under 35 U.S.C. §365 of International Application PCT/US2007/001542, filed Jan. 19, 2007 which was published in accordance with PCT Article 21(2) on Jul. 24, 2008 in English.

FIELD OF THE INVENTION

The present invention generally relates to digital disk recorders and more particularly to a logical storage partitioning for providing symmetrical storage access on intelligent digital disk recorders (iDDRs).

BACKGROUND OF THE INVENTION

Disks can be partitioned and different operating systems may be placed on separate partitions. Disks can also be partitioned to segregate and organize data or to generally improve efficiency. However, the organizational impetus for using partitions can also be accomplished through the use of directory hierarchies. On the other hand, disk partitions may be. required for the proper functioning of bootable operating system partitions.

Disk partitions can be optimized and others have explored ways to optimize storage partitions by placing system files at predetermined positions within a partition. The utilization efficiency of disk partitions has also been improved by using partitions sized to m to nth powers. Methods have also been developed for providing quick access to multidimensional data by using nested partitions.

Disks can be arranged into logical drives and these logical drives can be grouped or striped into known redundant array of independent disk RAID groups. At the very simplest level, RAID combines multiple hard drives into a single logical unit. Thus, instead of seeing several different hard drives, the operating system sees only one. RAID is typically used in processing dedicated to storage-intensive tasks, such as video and audio editing. RAID refers to a hard disk technology which can be used to provide redundancy and increase performance. There are several variations of a RAID configuration referred to as levels. Each level provides different performance or fault tolerance benefits. RAID configurations are commonly found in data critical applications.

Disk partition efficiencies have improved in general, but they have not addressed problems in the intelligent digital disk recorders iDDR segment of the market. An iDDR system must operate on as few disks as possible for cost reasons, but at the same time must provide high throughput data access such that multiple streams of video and audio may be optimally retrieved and stored. The intelligent digital disk recorders iDDRs market requires precise load balancing of operating system access, metadata/database/paging access, and media access must occur.

Higher speed recording is required for an on-demand manufacturing system for both increased throughput and reduced manufacturing cost. For an in-store on-demand replication application, reduced cycle times are desired to improve delivery time to the customer. For single optical pickup recording, dual layer DVD recording can take approximately 15 minutes. Known multiple optical heads in optical disc storage devices use the multiple heads in a non-synchronized manner to improve data recording and retrieval rates and for improved data access time for the device. However, a further faster recording time is needed to attract consumer use of in-store, on-demand replication services.

Accordingly, there is a need for symmetrical storage access on intelligent digital disk recorders iDDRs that overcomes the limitations of existing partitioning and storage balancing techniques for iDDRs.

SUMMARY OF THE INVENTION

A method includes designating at least three storage partitions on two logical drives, placing a first storage partition on a first of the logical drives adjacent to a second storage partition on a second of the logical drives separate from the first logical drive, and creating a third partition among both the first and second of the logical drives. The first, second and third partitions are balanced for storage access symmetry such that the drives bear equal storage placement. An apparatus includes a first storage partition on a first logical drive, a second storage partition on a second logical drive, and a third storage partition among both the first and second logical drives, storage on the partitions being configured for balanced capacity placement and access.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 1 is a diagram showing partitioning of system, data and striped media information across two physical disks in accordance with the invention;

FIG. 2 is a diagram showing symmetric storage partitioning of two logical drives as a RAID 1 level configuration in accordance with the invention;

FIG. 3 is a diagram showing symmetric storage partitioning of two logical drives as a RAID 3 level configuration in accordance with the invention; and FIG. 4 is a diagram showing symmetric storage partitioning of two logical drives as a RAID 5 level configuration in accordance with the invention.

It should be understood that the drawings are for purposes of illustrating the concepts of the invention and are not necessarily the only possible configuration for illustrating the invention.

DETAILED DESCRIPTION OF THE INVENTION

This invention is directed to intelligent digital disk recorders iDDRs which require precise load balancing of operating system access, metadata, database and paging access, and media access. To this end, the invention involves symmetric layout of data onto at most three separate partitions spread among two physical or logical drives. There are three macro categories of storage access on iDDRs: (1) operating system, (2) metadata/database/paging, and (3) media. The operating system is placed on a partition adjacent to, and on a separate disk as, the metadata/database partition. The media is striped among a single remaining partition that spans both disks. The result is storage access symmetry such that each disk in the iDDR bears an equal burden, thus lessening the need to use additional disks, thus lessening the overall cost of the system.

Video servers demand high performance and reliability from storage devices. A particular intelligent digital disk recorder IDDR product line, known as Turbo iDDR, requires the storage devices support multiple streams of high definition HD video, at 1× normal speeds, and even up to 13× shuttle speeds and higher, all the while importing, transcoding, and recording other material. Such storage bears a heavy burden. The original storage design called for three separate physical disks: one physical disk to handle operating system, paging, and metadata/database operations, and the other two physical disks to handle the media access such as video, audio, timecode, etc.

A significant cost reduction is obtained when reducing the number of physical disks from three to two in the Turbo iDDR product line. The problem with reducing the physical disks from three to two is how to load balance the input/output I/O requests evenly among two separate disks. Because of the asymmetric nature of the type of information read and written to and from the disks, a way is needed to organize data by type into various partitions such that the aggregate load on each disk was approximately equal. This would ensure maximum efficiency for the storage system as a whole, and allow taking advantage of fewer disks and ultimately removing unneeded cost from the system.

Recent trends in the area of storage technologies have resulted in continually higher density drives. 500 gigabyte GB drives are common today, and 1 terabyte TB size disk drives are on the horizon. Though the capacity of disk drives steadily increases, the performance, such as revolutions per minute RPM, seek times, etc., of disk drives in general tends to lag advances in capacity. The problem most often encountered in the intelligent digital disk recorder iDDR market segment is one of performance rather than capacity. As a result, multiple disk drives are usually required to achieve the necessary bandwidth to support the iDDR system.

An intelligent independent iDDR needs an efficient method of storing and retrieving critical operating system, paging, database/metadata, and media from as few disks as possible. This invention addresses the problem by grouping input/output I/O access patterns, based on access type, to spatially specific regions on each disk. This ensures symmetric, or near symmetric access, across as few disks as possible. For example, refer to the diagram 10 showing partitioning of system 2, data 3 and striped media information 1 across two physical disks in accordance with the invention.

The system partition 2 resides on the outer cylinders of the first physical disk drive. The data partition 3, which includes database, metadata, and memory paging file information, are on the outer cylinders of the other physical disk drive. The inner cylinders of each disk drive are striped together, i.e., clustered in parallel, as a RAID 0 level partition 1. The video, audio, time-code, and other media reside on this striped partition 1.

By placing the system partition 1 and the database/metadata/paging partition 3 on the outer cylinders, maximum performance of these critical operations are ensured. Geometrically, the outer cylinders serve more data than the inner cylinders for each rotation of the disk drive platter. Furthermore, the system partition is accessed approximately as frequently as the database/metadata/paging partition. In this way, the load is evenly distributed across both physical disk drives.

The RAID 0 striped media partition 1 serves all of the video, audio, timecode, and other media. Performance here is achieved through the use of a striped partition. In other words, both disks are serving media at approximately the same rate. The load is again evenly distributed across both physical disk drives. Though the inner cylinders generally do not perform as well as the outer cylinders, this is masked by the fact this partition is comprised of two physical disk drives, thus boosting the overall performance of the media partition.

This same arrangement of partitions and data is not limited to two physical drives, but also may be applied to two logical drives. The logical drives may be comprised of RAID 1, 3 or 5, as shown in FIGS. 2, 3 and 4, by their respective diagrams 20, 30 and 40.

Each of the configurations RAID 20, RAID 30 and RAID 40 contains no more than two logical drives. The arrangement of partitions remains the same. Again, this arrangement maximizes storage performance for iDDR systems, while at the same time minimizes the number of logical drives needed. The system partition 22, 23, 24 is placed on the outer cylinders of the first logical drive. The database/metadata/paging partition 32, 33, 34 is placed on the outer cylinders of the second logical drive. The RAID 0 striped media partition 12, 13, 14 spans both logical drives, on the inner cylinders. The use of logical drives provides data protection and redundancy. Each logical drive may be comprised of two or more physical drives. When the number of physical drives is increased for greater storage capacity for each partition, the relative load balancing or storage between the three partitions created remains consistent to provide the inventive symmetrical storage access.

Having described preferred embodiments for symmetrical storage and access for iDDRs, it is noted that modifications and variations can be made by persons skilled in the art in light of the above teachings.

The invention claimed is:

1. A method comprising:
designating three storage partitions on two logical drives;
placing a first storage partition for operating system information solely on a first of said logical drives;
placing a second storage partition for at least one of database, metadata, and paging information solely on a second of said logical drives separate from said first logical drive;
creating a third partition for media information among both said first and second of said logical drives; and
placing information based on a type of the information, wherein the type is one of operating system information; database, metadata, and paging information; and media information.

2. The method of claim 1, wherein information is placed based on the type of the information in order to provide substantial storage access symmetry, such that the aggregate load of information stored on the first and second logical drives is approximately equal.

3. The method of claim 1, wherein said step of placing information based on type includes placing operating system information exclusively on said first storage partition.

4. The method of claim 3, wherein said step of placing information based on the type of the information includes placing at least one database, metadata and paging information exclusively on said second storage partition.

5. The method of claim 1, wherein the step of placing information based on the type of the information includes placing media information exclusively on said third storage partition.

6. The method of claim 1, wherein the first and second logical drives are respective first and second physical drives.

7. The method of claim 6, wherein the step of placing includes placing the first partition on outer cylinders of the first physical disk drive.

8. The method of claim 7, wherein the second partition is on the outer cylinders of the second physical disk drive.

9. The method of claim 8, wherein the step of creating includes creating the third partition on the inner cylinders of each physical disk drive.

10. The method of claim 1, wherein the first and second logical drives comprise greater than two physical disk drives.

11. The method of claim 1, wherein placing the information based on the type of the information includes:
if the information is operating system information, placing the information exclusively in the first partition;
wherein if the information is any of database, metadata, and paging information, placing the information exclusively in the second partition; and
wherein if the information is media information, placing the information exclusively in the third partition.

12. The method of claim 1, wherein the third partition is a striped partition spanning the first and second logical drives.

13. The method of claim 12, wherein the third partition is a RAID partition.

14. An apparatus comprising:
two logical drives comprising:
a first storage partition for operating system information solely on a first logical drive of the two logical drives;
a second storage partition for at least one of database, metadata, and paging information solely on a separate second logical drive of the two logical drives; and
a third storage partition for media information among both said first and second logical drives.

15. The apparatus of claim 14, wherein the first storage partition is for storing all of the operating system information for the two logical drives, the second storage partition is for storing all of the database, metadata and paging information for the two logical drives, and the third partition is for storing all of the media information for the two logical drives.

16. The apparatus of claim 14, wherein the logical drives comprise multiple physical disk drives.

17. The apparatus of claim 16, wherein the first storage partition is on the outer cylinders of the physical disk drives of the first logical drive, and the second storage partition is on the outer cylinders of the physical disk drives of the second logical drive, and the third storage partition is on the inner cylinders of the physical disk drives of both the first and second logical drives.

18. The apparatus of claim 14, wherein the logical drives are respective physical disk drives.

19. The apparatus of claim 18, wherein the first storage partition is on the outer cylinders of the first physical disk drive, the second storage partition is on the outer cylinders of the second physical disk drive and the third storage partition is on the inner cylinders of both physical disk drives.

20. The apparatus of claim 19, wherein if the information is operating system information, the information is stored exclusively on the first partition; if the information is media information, the information stored exclusively on the third partition; and if the information is any of database, metadata and paging information, the information is stored exclusively on the second partition.

21. The apparatus of claim 14, wherein the third partition is a striped partition spanning the first and second logical drives.

22. The apparatus of claim 21, wherein the third partition is a RAID partition.

23. The apparatus of claim 14, wherein information storage on said partitions is separated according to the type of the information among the first, second, and third partitions, such that the aggregate load on the first and second logical drives is approximately equal.

* * * * *